United States Patent [19]

Graiver et al.

[11] Patent Number: 5,710,300
[45] Date of Patent: Jan. 20, 1998

[54] SILOXY PHOSPHONATE AS STABILIZING AGENT FOR POLYDIORGANOSILOXANES

[75] Inventors: Daniel Graiver, Midland; Arnold Wade Lomas, Rhodes, both of Mich.

[73] Assignee: Dow Corning Corporation, Midland, Mich.

[21] Appl. No.: 827,822

[22] Filed: Apr. 11, 1997

[51] Int. Cl.⁶ .................................................. C07F 7/08
[52] U.S. Cl. .......................... 556/401; 528/14; 528/23
[58] Field of Search .......................... 556/401; 528/14, 528/23

[56] References Cited

U.S. PATENT DOCUMENTS

| | | | |
|---|---|---|---|
| 4,125,551 | 11/1978 | Petersen | 260/448.2 E |
| 4,177,200 | 12/1979 | Razzano et al. | 260/448.2 N |
| 4,551,515 | 11/1985 | Herberg et al. | 528/18 |
| 5,041,586 | 8/1991 | Beck et al. | 556/405 |
| 5,099,051 | 3/1992 | Beck et al. | 556/401 |
| 5,481,014 | 1/1996 | Graiver et al. | 556/401 |
| 5,659,056 | 8/1997 | Hergenrother et al. | 556/401 |

*Primary Examiner*—Paul F. Shaver
*Attorney, Agent, or Firm*—Melvin D. Fletcher

[57] ABSTRACT

A method for stabilizing a mixture comprising a polydiorganosiloxane and an alkali metal. The method comprises contacting a polydiorganosiloxane and an alkali metal with a siloxy phosphonate described by formula

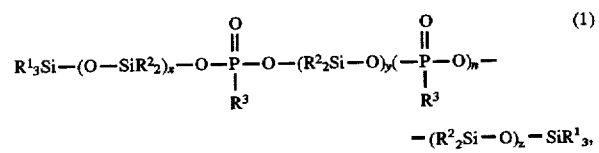

where each $R^1$, $R^2$, and $R^3$ is an independently selected hydrocarbon comprising one to about 12 carbon atoms, n=0 or 1, and x, y, and z are integers, where x=1 to 1000, y=0 to 1000, and z=0 to 1000.

14 Claims, No Drawings

SILOXY PHOSPHONATE AS STABILIZING AGENT FOR POLYDIORGANOSILOXANES

BACKGROUND OF THE INVENTION

The present invention is a method for stabilizing a mixture comprising polydiorganosiloxanes and an alkali metal. The method comprises contacting a mixture comprising a polydiorganosiloxane and an alkali metal with a siloxy phosphonate described by formula

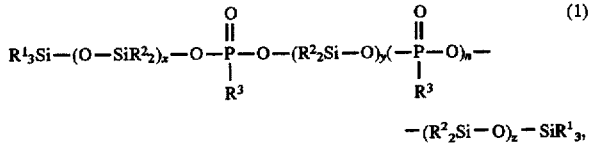

$$-(R^2_2Si-O)_z-SiR^1_3,$$

where each $R^1$, $R^2$, and $R^3$ is an independently selected hydrocarbon group comprising one to about 12 carbon atoms, n=0 or 1, x, y, and z are integers, where x=1 to 1000, y=0 to 1000, and z=0 to 1000.

Polydiorganosiloxanes are used in fluid form and are cross-linked to form, for example, silicone rubbers and resins. Many of the uses of polydiorganosiloxane fluids, silicone rubbers and resins require that the material be stable when exposed to high temperatures. Typically, polydiorganosiloxanes are prepared by heating low molecular weight linear polydiorganosiloxanes and cyclic polydiorganosiloxanes at a temperature above about 100° C. in the presence of a strong base comprising an alkali metal such as potassium hydroxide or potassium silanolate to form an equilibrium mixture. Other known alkali metal containing catalyst for this type of polymerization include sodium hydroxide, cesium hydroxide, lithium hydroxide, and their corresponding silanolates or siloxanates. In the case of cyclic polydiorganosiloxane polymerization, a ring opening reaction occurs to form linear polymers. Typically the polymerization product is an equilibrium mixture comprising linear polydiorganosiloxanes as a major portion and cyclic polydiorganosiloxane as a minor portion. The presence of the cyclic polydiorganosiloxane in the product is undesirable because cyclics can have a high vapor pressure and cause problems during use and therefore the cyclics are typically removed. The most convenient method of removing cyclic siloxanes from the product is distilling them off by heating under reduced pressure. However if the basic catalyst activity is not stabilized, additional cyclic siloxanes will be generated during the distillation process to maintain equilibrium conditions. Therefore, it is important in the preparation of linear polydiorganosiloxanes to stabilize the basic catalyst to both improve process yield and to stabilize final product.

Various methods of stabilizing the basic catalyst which may be present in polydiorganosiloxanes have been used in the past. For example, strong acids such as hydrochloric acid and sulfuric acid have been suggested as useful. But, since strong acids are also known equilibrium catalyst for cyclic and linear polydiorganosiloxanes, the acid amount must be controlled carefully to prevent excess acid which can cause degradation of the polydiorganosiloxanes.

Triprotic acids such as phosphoric acid and arsenic acid have been proposed as useful for stabilizing basic catalyst comprising alkali metal compounds by serving as a buffering agent. The use of arsenic acid is generally not desirable due to its toxicity. Although phosphoric acid has good buffering capabilities and lower toxicity, its use as a neutralizing agent is limited due to its insolubility in polydiorganosiloxanes. To be an effective catalyst stabilizer, the stabilizing material needs to be soluble in the polydiorganosiloxane so that it can contact the alkali metal which is often located in the equilibrium mixture on the terminal silicon atoms of the polydiorganosiloxane.

Graiver et al., U.S. Pat. No. 5,481,014, describe a process for preparing low molecular weight silyl phosphonates that are soluble in disiloxanes and have improved stability in octamethyltetracyclosiloxane. The silyl phosphonates are prepared by reacting phosphonic acid and a silane or siloxane in the presence of an alkali metal.

Razzano et al., U.S. Pat. No. 4,177,200, describe a process for preparing low molecular weight silyl phosphates which are soluble in polydiorganosiloxanes. The silyl phosphates are prepared by the reaction of a linear siloxane and a phosphorous oxyhalogen or phosphoric acid. Razzano et al., teach the silyl phosphates are useful for the continuous neutralization of alkali metal hydroxides in an equilibrium mixture of polydiorganosiloxanes.

Petersen, U.S. Pat. No. 4,125,551, describes a catalyst for use in a process for preparing silyl phosphates. The process taught by Petersen comprises reacting phosphoric acid with a linear polysiloxane in the presence of a silyl phosphate. The presence of the silyl phosphate allows the reaction to initiate quickly and smoothly. A portion of the silyl phosphate from a previous run can be used as the catalytic amount of silyl phosphate. Petersen teaches the silyl phosphates prepared by the described process can be used as a neutralizing agent for neutralizing alkali metal hydroxides and bases in siloxane solutions.

Beck et al., U.S. Pat. No. 5,041,586, teach the preparation of low molecular weight silyl phosphate mixtures by adding phosphoric acid to hexamethyldisiloxane under reflux. The resulting mixture is reported to comprise 10 to 30 weight percent of monosilyl phosphate, 65 to 85 weight percent of disilyl phosphate, and 2 to 7 weight percent of trisilyl phosphate. This mixture is reported to be useful in stabilizing basic polymerization catalysts, such as potassium hydroxide or potassium silanolate, when such catalyst are present in polydiorganosiloxane mixtures.

Beck et al., U.S. Pat. No. 5,099,051, teach the preparation of siloxanyl-phosphate mixtures by reacting a cyclopolydimethylsiloxane and a silylphosphate mixture, as described in Beck et al., U.S. Pat. No. 5,041,586. The siloxanylphosphate mixtures are reported to be useful in stabilizing basic polymerization catalysts, such as potassium hydroxide or potassium silanolate, when such catalyst are present in polydiorganosiloxane mixtures.

Herberg et al., U.S. Pat. No. 4,551,515, teach that agents such as phosphoric acid, tri(chloroethyl)phosphite and silyl phosphate can be used to neutralize basic polymerization catalyst present in compositions comprising polydiorganosiloxanes.

The present inventors have discovered that siloxy phosphonates can be used to stabilize mixtures comprising polydiorganosiloxane and alkali metal. These siloxy phosphonates are readily soluble in the polydiorganosiloxanes and do not cause gelation of the silicone gum upon heating. Another advantage is the elimination of the need to dilute the siloxy phosphonates in cyclic polydiorganosiloxanes prior to addition into the reaction mixture since the siloxy phosphonates can be precisely metered without dilution in cyclic polydiorganosiloxanes. Another advantage is these siloxy phosphonates can be stored over an extended time period without drifting in viscosity.

SUMMARY OF INVENTION

The present invention is a method for stabilizing a mixture comprising polydiorganosiloxane and an alkali metal.

The method comprises contacting a mixture comprising a polydiorganosiloxane and an alkali metal with a siloxy phosphonate described by formula

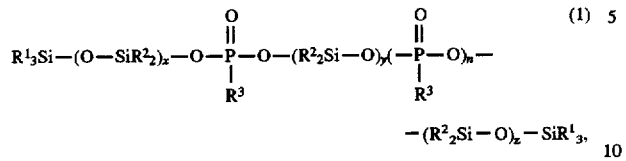

where each $R^1$, $R^2$, and $R^3$ is an independently selected hydrocarbon group comprising from one to about 12 carbon atoms, n=0 or 1, x, y, and z are integers, where x=1 to 1000, y=0 to 1000, and z=0 to 1000.

DESCRIPTION OF INVENTION

The present invention is a method for stabilizing polydiorganosiloxanes admixed with an alkali metal. The method comprises contacting a mixture comprising a polydiorganosiloxane and an alkali metal with a stabilizing amount of a siloxy phosphonate described by formula

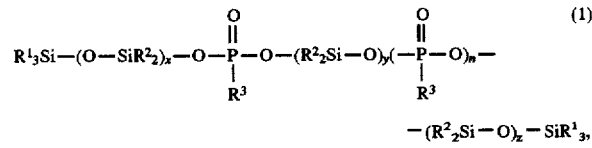

where each $R^1$, $R^2$, and $R^3$ is an independently selected hydrocarbon group comprising from one to about 12 carbon atoms, n=0 or 1, x, y, and z are integers, where x=1 to 1000, y=0 to 1000, and z=0 to 1000.

In the present method a mixture comprising a polydiorganosiloxane and an alkali metal is contacted with a stabilizing amount of a siloxy phosphonate, thereby reducing the tendency of the mixture to reequilibrate to form a cyclic polydiorganosiloxane fraction. The polydiorganosiloxanes which can be stabilized by the present process are any of those known in the art. Generally, the polydiorganosiloxanes can comprise repeating units described by formula $-(R^4_2SiO)_q-$, where each $R^4$ can be an independently selected hydrocarbon comprising less than about 12 carbon atoms. $R^4$ can be a saturated, unsaturated, substituted, or unsubstituted hydrocarbon. $R^4$ can be for example, an alkyl such as methyl, ethyl, propyl, and tert-butyl; an aryl such as phenyl; an alkenyl such as vinyl, allyl, and hexenyl; a cycloalkyl such as cyclopentyl and cyclohexyl; a substituted alkyl such as 3,3,3-trifluoropropyl; and a substituted aryl such as chlorophenyl. The number of repeating units denoted by q can be from about two to 100,000 or greater. The polydiorganosiloxane can be a linear or branched polymer. The polydiorganosiloxane can be monodispersed or polydispersed. The polydiorganosiloxane can be a homopolymer, or a block or random copolymer. The polydiorganosiloxane may be end-terminated, for example, with silyl groups described by formula $(R^4_2R^5SiO)-$, where $R^4$ is as previously described and $R^5$ is selected from a group consisting of $R^4$, hydrogen, and hydroxy. The polydiorganosiloxane can be, for example, trimethylsiloxy end-terminated polydimethylsiloxane, vinyldimethylsiloxy end-terminated polydimethylsiloxane, vinyldimethylsiloxy end-terminated polydimethylsiloxane having pendant vinyl groups attached to silicon, dimethylhydroxysiloxy end-terminated polydimethylsiloxane, dimethylhydrosiloxy end-terminated polydimethylsiloxane, dimethylhydrosilyl end-terminated polydimethylsiloxane having pendant hydrogens attached to silicon, trimethylsiloxy or 3,3,3-trifluoropropyldimethylsiloxy end-terminated polydiorganosiloxane having about 50 percent pendant organic groups attached to silicon being methyl and the remainder being 3,3,3-trifluoropropyl, and trimethylsiloxy end-terminated copolymer comprising methylphenylsiloxy and dimethylsiloxy units.

The present method is useful for stabilizing a mixture comprising a polydiorganosiloxane and an alkali metal, where the mixture results from the polymerization of cyclic or short-chain polydiorganosiloxanes, and mixtures thereof, in the presence of an alkali metal hydroxide or silanolate. The mixture can be made by polymerizing cyclic polydiorganosiloxanes having on average from three to six diorganosiloxy units per molecule with an alkali metal compound. The alkali metal compound can be metal hydroxides such as potassium hydroxide, sodium hydroxide, lithium hydroxide, cesium hydroxide, calcium hydroxide, and magnesium hydroxide or a metal silanolate derived from the same alkali metals. The present method is especially useful for stabilizing a mixture comprising polydimethylsiloxanes and potassium hydroxide or potassium silanolate.

The stabilizing agents useful in the present method are siloxy phosphonate, both herein referred to as siloxy phosphonate as described in formula (1). By "stabilizing amount" it is meant that the siloxy phosphonate is present at a concentration sufficient to reduce or prevent scission of the Si—O—Si bonds of the polydiorganosiloxane. The siloxy phosphonate can comprise one or two radicals $R^3$ bonded directly to phosphorous atoms. A preferred siloxy phosphonate is when in formula (1) n=0. Each $R^3$ can be an independently selected hydrocarbon comprising one to about twelve carbon atoms. $R^3$ can be a substituted, unsubstituted, saturated, or unsaturated hydrocarbon. $R^3$ can be for example, alkyl, alkenyl, aryl, and cycloalkyl. $R^3$ can be for example, methyl, ethyl, butyl, vinyl, allyl, phenyl, cyclohexyl, and perfluoropropyl. Preferred is when $R^3$ is an unsubstituted hydrocarbon comprising less than about seven carbon atoms. Even more preferred is when $R^3$ comprises about one to two carbon atoms. In formula (1), the number of repeating units denoted by x can be from about one to 1000, y can be from about zero to 1000, and z can be from about zero to 1000. It is preferred when x is from about 10 to 50, y is from about 10 to 50, n and z are zero. The terminal group can be described by formula $-SiR^2_3$, where each $R^2$ is an independently selected hydrocarbon group comprising one to about 12 carbon atoms. $R^2$ can be substituted, unsubstituted, saturated, or unsaturated hydrocarbons. $R^2$ can be for example, alkyl, alkenyl, aryl, and cycloalkyl. $R^2$ can be for example, methyl, ethyl, butyl, vinyl, allyl, phenyl, cyclohexyl, and perfluoropropyl. Preferred is when $R^2$ is methyl.

The method for preparing the siloxy phosphonate is not critical to the present invention and can be any of those known in the art. For example, reference to such preparatory procedures is made in Tetrahedron, Vol. 45, No. 9, p. 2479, where it is taught that silyl esters of P=O acids can be obtained by silylation of the acid with alkoxysilanes, triorganosilanols, or disiloxanes.

The siloxy phosphonate described by formula (1) is highly soluble in polydiorganosiloxanes and therefore quickly mixes with the mixture comprising a polydiorganosiloxane and an alkali metal to neutralize the alkali metal. The stabilizing amount of siloxy phosphonate can be any amount which reduces scission of Si—O—Si bonds in the polydiorganosiloxane polymer. Generally it is preferred to provide at least a 0.1:1 to 10:1 mole ratio of phosphorous relative to the alkali metal atoms present in the polydiorganosiloxane. More preferred is at least a 0.5:1 to 2:1 mole ratio of phosphorous relative to the alkali metal atoms present in the polydiorganosiloxane. Most preferred is at least one phosphorous atom per each alkali metal atom.

The method for contacting the mixture comprising the polydiorganosiloxane and alkali metal with the siloxy phosphonate can be any standard method, for example, a mixer, blender, mill, or reactor. The temperature at which the mixture comprising the polydiorganosiloxane and alkali metal is contacted with the siloxy phosphonate is not critical and can generally be any temperature above about 20° C. A preferred temperature is within a range of about 100° C. to 300° C. Even more preferred is a temperature within a range of about 225° C. to 275° C.

The present method for stabilizing polydiorganosiloxanes can be conducted as a batch process or as a continuous process. In some cases it may be desirable to first neutralize the polydiorganosiloxane with $CO_2$ and then add the siloxy phosphonate to the neutralized, but unstabilized polydiorganosiloxane.

The following examples are provided to illustrate the present invention. These examples are not intended to limit the scope of the provided claims.

Example 1. The ability to make a medium molecular weight bis(polysiloxy) vinyl phosphonate stabilizer was evaluated. The bis(polysiloxy) vinyl phosphonate was prepared by adding 0.25 mole of vinyl phosphonic acid, 185 grams of 5 mPa. s at 25° C. polydimethylsiloxane and 48 grams of cyclohexane to a 500 mL flask. The flask was purged with dry nitrogen and maintained under a nitrogen blanket during the process. The reaction mixture was heated to its reflux temperature of about 113° C. and refluxing continued for 16.5 hours, with moderate agitation. At the end of reflux the temperature was 130° C. A total of 0.25 mole of water were removed from the flask by azeotropic distillation. The flask content was cooled to 25° C. and a clear liquid product recovered. Excess cyclohexane was stripped from the product by distilling at 50° C. for 0.5 hours and a pressure of 0.27 kPa. The resulting product was a clear homogeneous liquid that was completely miscible with octamethyltetrasiloxane forming a clear mixture. The product was analyzed and determined to have a viscosity of about 10 mPa. s at 25° C.

Example 2. The ability of a higher molecular weight bis(polysiloxy) vinyl phosphonate to stabilize a polydimethylsiloxane gum was evaluated. The bis(polysiloxy) vinyl phosphonate was prepared by adding 0.014 mole of vinyl phosphonic acid, 214.3 grams of 350 mPa. s at 25° C. polydimethylsiloxane and 50 grams of cyclohexane to a 500 mL flask. The flask was purged with dry nitrogen and maintained under a nitrogen blanket during the process. The reaction mixture was heated to its reflux temperature of about 110° C. and refluxing continued for 15 hours, with moderate agitation. A total of 0.022 mole of water were removed from the flask by azeotropic distillation. The flask content was cooled to 25° C. and a clear liquid product recovered. Excess cyclohexane was stripped from the product by distilling at 50° C. for 0.5 hours and a pressure of 0.27 kPa. The resulting clear product was analyzed for viscosity using a Brookfield viscometer and had a viscosity of 425 mPa. s at 25° C.

A mixer was loaded with 1 kg of vinyldimethyl end-terminated polydimethylsiloxane gum having 0.14 mole percent pendent vinyl (Williams plasticity 140–165 mm/100 s) which contained 18–20 ppm potassium and neutralized with $CO_2$. About 7 grams of the bis(polysiloxy) vinyl phosphonate were added to the mixer. The mixer was sealed and run at 35 rpm under $N_2$ at a temperature of 250° C. and a pressure of 2.67 kPa for about 0.5 hour.

The heat stability of the treated vinyldimethyl end-terminated polydimethylsiloxane gum was determined by standard thermal gravimetric procedures. The unstabilized gum exhibited a 10% weight loss at 340° C. The material stabilized with bis(polysiloxy) vinyl phosphonate exhibited a 10% weight loss at 428° C.

Example 3. The ability of a high molecular weight bis (polysiloxy) vinyl phosphonate to stabilize a polydimethylsiloxane gum was evaluated. The bis(polysiloxy) vinyl phosphonate was prepared by adding (0.014) mole of vinyl phosphonic acid, (242.4) grams of 1000 mPa. s at 25° C. polydimethylsiloxane and (50) grams of cyclohexane to a (500) mL flask. The flask was purged with dry nitrogen and maintained under a nitrogen blanket during the process. The reaction mixture was heated to its reflux temperature of about 110° C. and refluxing continued for (15) hours, with moderate agitation. A total of (0.022) mole of water were removed from the flask by azeotropic distillation. The flask content was cooled to 25° C. and a clear liquid product recovered. Excess cyclohexane was stripped from the product by distilling below 70° C. and at pressure of 1.33 kPa. The resulting clear product was analyzed for viscosity using a Brookfield viscometer and had a viscosity of 1390 mPa. s at 25° C.

A mixer was loaded with 1 kg of vinyldimethyl end-terminated polydimethylsiloxane gum having (0.14) mole percent pendent vinyl (Williams plasticity (140–165) mm/100 s) which contained (18–20) ppm potassium and neutralized with $CO_2$. About (10.5) grams of the bis (polysiloxy) vinyl phosphonate were added to the mixer. The mixer was sealed and run at 35 rpm under $N_2$ at a temperature of 250° C., and a pressure of 2.67 kPa for about 0.5 hour. Elemental analysis indicated 0.12 percent phosphorus in the phosphorate.

The heat stability of the treated vinyldimethyl end-terminated polydimethylsiloxane gum was determined by standard thermal gravimetric procedures. The unstabilized gum exhibited a 10% weight loss at 340° C. The material stabilized with bis(polysiloxy) vinyl phosphonate exhibited a 10% weight loss at 446° C.

We claim:

1. A method for stabilizing polydiorganosiloxanes, the method comprising: contacting a mixture comprising a polydiorganosiloxane and an alkali metal with a stabilizing amount of a siloxy phosphonate described by formula

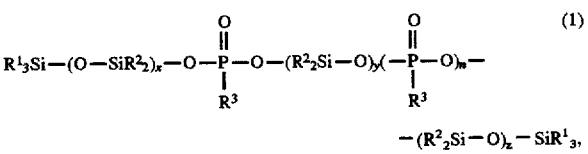

$$R^1{}_3Si-(O-SiR^2{}_2)_x-O-\overset{\overset{O}{\|}}{\underset{R^3}{P}}-O-(R^2{}_2Si-O)_y(-\overset{\overset{O}{\|}}{\underset{R^3}{P}}-O)_n- \quad (1)$$

$$-(R^2{}_2Si-O)_x-SiR^1{}_3,$$

where each $R^1$, $R^2$, and $R^3$ is an independently selected hydrocarbon group comprising one to about twelve carbon atoms, n=0 or 1, x, y, and z are integers, where x=1 to 1000, y=0 to 1000, and z=0 to 1000.

2. A method according to claim 1, where the polydiorganosiloxane is selected from the group consisting of trimethylsiloxy end-terminated polydimethylsiloxane, vinyldimethylsiloxy end-terminated polydimethylsiloxane, vinyldimethylsiloxy end-terminated polydimethylsiloxane having pendant vinyl groups attached to silicon, dimethylhydroxysiloxy end-terminated polydimethylsiloxane, dimethylhydrosiloxy end-terminated polydimethylsiloxane having pendant hydrogens attached to silicon, or (3,3,3-trifluoropropyl)dimethylsiloxy end-terminated polydiorganosiloxane having about 50 percent of pendant organic groups attached to silicon comprising methyl and the remainder pendant organic groups comprising 3,3,3-trifluoropropyl.

3. A method according to claim 1, where the alkali metal is potassium.

4. A method according to claim 1, where $R^1$ is an unsubstituted hydrocarbon group comprising less than about seven carbon atoms.

5. A method according to claim 1, where $R^1$ comprises about one to two carbon atoms.

6. A method according to claim 1, where $R^3$ is vinyl.

7. A method according to claim 1, where $R^2$ is methyl.

8. A method according to claim 1, where the siloxy phosphonate is a mixture of mono and bis(polysiloxy) phosphonates.

9. A method according to claim 1, where the siloxy phosphonate provides about 0.1:1 to 10:1 mole ratio of phosphorous to alkali metal atoms.

10. A method according to claim 1, where the siloxy phosphonate provides about 0.5:1 to 2:1 mole ratio of phosphorous to alkali metal atoms.

11. A method according to claim 1, where the siloxy phosphonate provides at least one phosphorous atom per each alkali metal atom.

12. A method according to claim 1, where the mixture is contacted with the siloxy phosphonate at a temperature within a range of about 100° C. to 300° C.

13. A method according to claim 1, where the mixture is contacted with the siloxy phosphonate at a temperature within a range of about 225° C. to 275° C.

14. A method according to claim 1, further comprising contacting the mixture with carbon dioxide gas before contact with the siloxy phosphonate.

* * * * *